United States Patent
Kim et al.

(10) Patent No.: US 8,817,849 B2
(45) Date of Patent: Aug. 26, 2014

(54) METHODS AND SYSTEMS FOR TRANSMITTING DATA BY MODULATING TRANSMITTER FILTER COEFFICIENTS

(75) Inventors: Jaeha Kim, Los Altos, CA (US); Haechang Lee, Los Altos, CA (US); Jung-Hoon Chun, Mountain View, CA (US); Jared Zerbe, Woodside, CA (US)

(73) Assignee: Rambus Inc., Sunnyvale, CA (US)

(*) Notice: Subject to any disclaimer, the term of this patent is extended or adjusted under 35 U.S.C. 154(b) by 1097 days.

(21) Appl. No.: 12/597,590

(22) PCT Filed: Mar. 25, 2008

(86) PCT No.: PCT/US2008/003961
§ 371 (c)(1),
(2), (4) Date: Oct. 26, 2009

(87) PCT Pub. No.: WO2008/150321
PCT Pub. Date: Dec. 11, 2008

(65) Prior Publication Data
US 2010/0142607 A1 Jun. 10, 2010

Related U.S. Application Data

(60) Provisional application No. 60/931,924, filed on May 25, 2007.

(51) Int. Cl.
*H04B 1/38* (2006.01)
(52) U.S. Cl.
USPC ............................................. 375/219
(58) Field of Classification Search
CPC .............. H04B 1/00; H04B 1/10; H04B 3/04; H04B 15/00; H03G 11/04; H03H 7/30; H03H 7/40; H03K 5/159; H03K 9/02; H03K 17/16; H03K 19/0175; H04L 25/03; H04L 25/03885; H04L 25/38; H04L 27/00; H04L 27/01; H04L 27/06
USPC ......... 375/261, 285, 296, 316, 219, 229–236, 375/346–355; 455/307; 714/769; 326/21, 326/27, 38, 83, 87; 333/18; 370/464, 522, 370/535; 708/322, 323
See application file for complete search history.

(56) References Cited

U.S. PATENT DOCUMENTS 6,212,661 B1 * 4/2001 Rub et al. .................... 714/769
6,470,047 B1 * 10/2002 Kleinerman et al. ......... 375/232
(Continued)

OTHER PUBLICATIONS

Glavin et al., "A time-Delayed DFE QAM Adaptive Precoder", Communications, 2004 IEEE International Conference on Paris, France, Jun. 20-24, 2004, Piscataway, JF, USA, IEEE, vol. 5, Jun. 20, 2004, pp. 2726-2730, XP010709735 ISBN: 978-0/7803-8533-7 Section II.C.

(Continued)

*Primary Examiner* — Sam K Ahn
*Assistant Examiner* — Shawkat M Ali
(74) *Attorney, Agent, or Firm* — Silicon Edge Law Group LLP; Arthur J. Behiel (57) ABSTRACT

A signaling system supports main and auxiliary communication channels between integrated circuits in the same direction over a single link. An equalizing transmitter applies appropriate filter coefficients to minimize the impact of intersymbol interference when transmitting the main data over a communication channel. The transmitter modulates at least one of the filter coefficients with the auxiliary data to induce apparent ISI in the transmitted signal. A main receiver ignores the apparent ISI to recover the main data, while an auxiliary receiver detects and demodulates the apparent ISI to recover the auxiliary data. The auxiliary data may be encoded using spread-spectrum techniques to reduce the impact of the auxiliary data on the main data.

26 Claims, 7 Drawing Sheets

(56) References Cited

U.S. PATENT DOCUMENTS

| | | |
|---|---|---|
| 2004/0008764 A1 | 1/2004 | Seo et al. |
| 2004/0047409 A1* | 3/2004 | Lee et al. .................. 375/232 |
| 2004/0119482 A1* | 6/2004 | Tripathi et al. ............. 324/641 |
| 2005/0111585 A1* | 5/2005 | Stojanovic et al. .......... 375/316 |
| 2005/0157822 A1* | 7/2005 | Khandekar et al. .......... 375/340 |
| 2006/0115029 A1* | 6/2006 | Marrow ...................... 375/348 |
| 2006/0276156 A1* | 12/2006 | Nakada et al. .............. 455/307 |
| 2007/0165680 A1* | 7/2007 | Harres ........................ 370/522 |
| 2008/0075159 A1* | 3/2008 | Sontowski et al. .......... 375/232 |
| 2008/0232268 A1* | 9/2008 | Kahrizi et al. .............. 370/252 |

OTHER PUBLICATIONS

Notification of Transmittal dated Sep. 18, 2008 of the International Search Report and the Written Opinion of the International Searching Authority for PCT/US2008/003961. 14 pages.

\* cited by examiner

METHODS AND SYSTEMS FOR TRANSMITTING DATA BY MODULATING TRANSMITTER FILTER COEFFICIENTS

FIELD

The subject matter disclosed herein relates generally to the field of communications, and more particularly to high speed electronic signaling within and between integrated circuit devices.

BACKGROUND

Signal distortion limits the sensitivity and bandwidth of any communication system. A form of distortion commonly referred to as intersymbol interference (ISI) is manifested in the temporal spreading and consequent overlapping of individual pulses, or "symbols." Severe ISI prevents receivers from distinguishing symbols and consequently disrupts the integrity of received signals.

The quality of high-speed signals is largely dependent upon characteristics of the communication channel. In extreme cases, ISI imposed by the channel renders the received data entirely unintelligible. Transmitters and receivers are therefore equipped with various forms of equalizers designed to offset channel-induced distortion. These equalizers are commonly adjustable to account for differences between channels.

Receivers in high-speed communication systems sometimes include control circuitry that monitors various characteristics of incoming signals and tunes the associated equalization circuitry accordingly. Such equalization adjustments may be done once, to account for channel characteristics and process variations, or may be carried out continuously or periodically to additionally account for time-variant parameters, such as supply voltage and temperature. Applying such adjustments to an equalizing transmitter requires receivers to communicate back to the associated transmitter, a process sometimes referred to as "backchannel" communication.

Backchannel communication takes place in the direction opposite the flow of data, and so may require one or more additional signal paths and associated pins between the communicating circuits. Unfortunately, as circuit features grow smaller, the number of physical pads that fits on the surface of a semiconductor die becomes a limiting factor on the amount of logic instantiated on a given circuit die. It is therefore undesirable to provide dedicated pins in support of backchannel communication.

Many communication systems support bidirectional communication, in which case backchannel communication in support of a forward channel can be incorporated into a return channel. For example, in a system in which first and second integrated circuits are connected via forward and return paths, control bits for the transmitter on the first integrated circuit can be inserted into the return path. Unfortunately, this option potentially reduces the communication bandwidth of the return path and requires the integrated circuits adopt a modified communication protocol. There is therefore a desire for improved support for backchannel communication. More generally, there is a desire to support additional communication channels within and between integrated circuits without the need for additional pads and associated conductors.

BRIEF DESCRIPTION OF THE DRAWINGS

The subject matter disclosed is illustrated by way of example, and not by way of limitation, in the figures of the accompanying drawings and in which like reference numerals refer to similar elements and in which.

DETAILED DESCRIPTION

According to some embodiments, a signaling system supports main and auxiliary communication channels between integrated circuits in the same direction over a single link. An equalizing transmitter applies appropriate filter coefficients to minimize the impact of intersymbol interference when transmitting the main data over a communication channel. The transmitter modulates at least one of the filter coefficients with the auxiliary data to induce apparent ISI in the transmitted signal. A main receiver ignores the apparent ISI to recover the main data, while an auxiliary receiver detects and demodulates the apparent ISI to recover the auxiliary data. The auxiliary data may be encoded using spread-spectrum techniques to reduce the impact of the auxiliary data on the main data.

Figure 1:
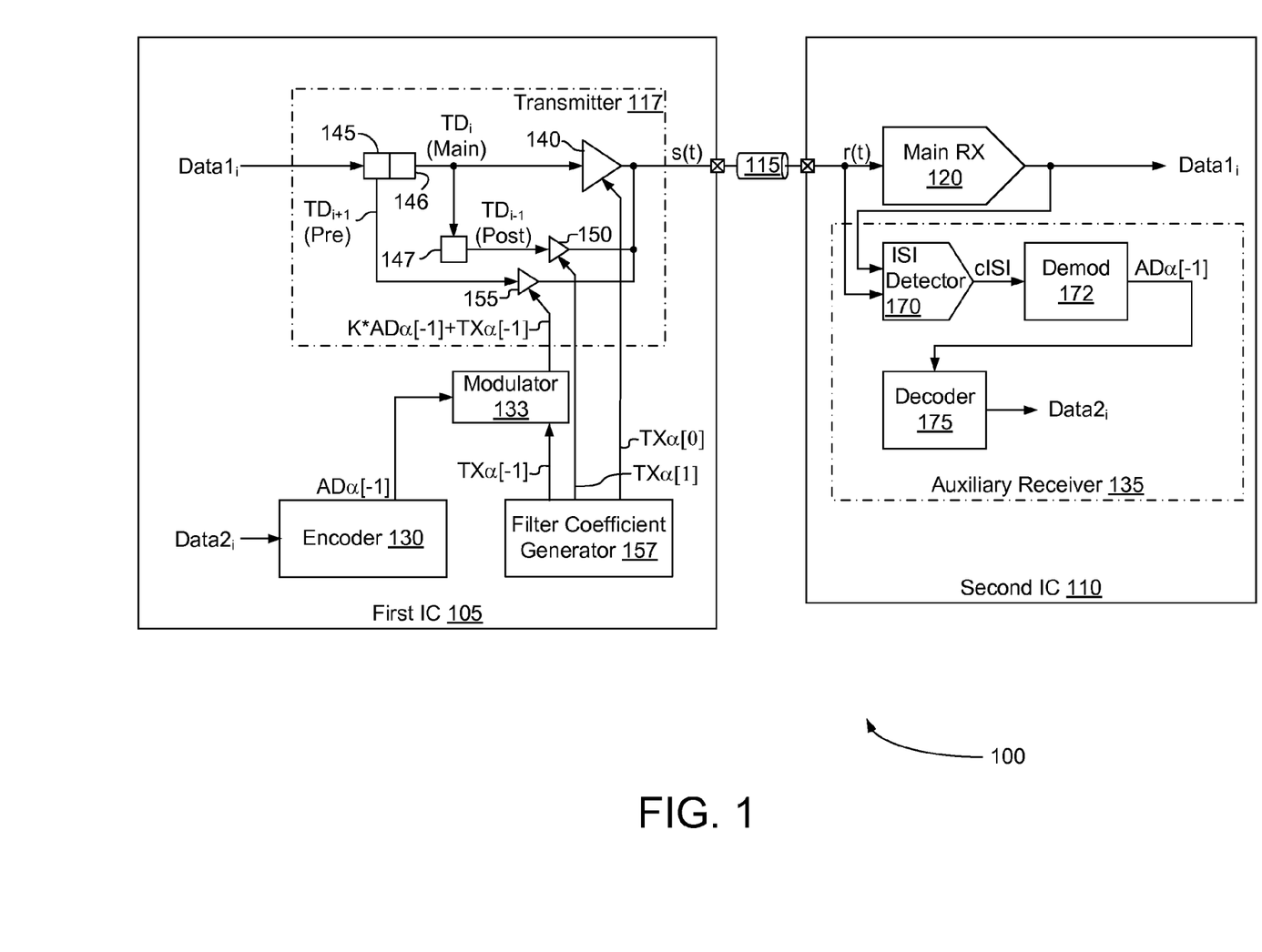
FIG. 1 illustrates a signaling system 100, in accordance with one embodiment, that supports main and auxiliary communication channels between a first integrated circuit (IC) 105 and a second IC 110 over a single link 115.

FIG. 1 illustrates a signaling system 100, in accordance with one embodiment, that supports main and auxiliary communication channels conveying data from a first integrated circuit (IC) 105 to a second IC 110 over a single link 115. An equalizing transmitter 117 includes transmit-equalization circuitry to account for channel-dependent attenuation, and thus facilitate higher signal rates. For the main, high-speed channel, transmitter 117 transmits a main bit sequence $Data1i$ over link 115 as a continuous-time signal s(t). A main-data receiver 120 on second IC 110 receives a signal r(t) that is a version of signal s(t) distorted by the channel. Receiver 120 converts signal r(t) into a second bit stream that, in the absence of errors, matches bit sequence $Data1_j$.

For the auxiliary channel, an encoder 130 encodes auxiliary data $Data2_i$ and a modulator 133 modulates a filter-coefficient input signal of transmitter 117 with the resulting encoded signal during transmission of main $Data1_i$. Modulating the filter coefficient combines the auxiliary data with the main data by introducing small changes in continuous-time signals s(t) and r(t) that appear to receiver 120 as ISI in the response of the main channel. Signal r(t) thus exhibits both channel-induced ISI and apparent ISI, the latter being modulated with the encoded auxiliary data Data2. The combination of channel-induced ISI and apparent ISI is herein termed the "cumulative ISI," or cISI. An auxiliary receiver 135 in second IC 110 detects the cumulative ISI in received signal r(t), demodulates the encoded auxiliary data from the detected cumulative ISI, and decodes the auxiliary data $Data2_i$. As detailed below in connection with other embodiments, auxiliary receiver 135 may additionally provide measures of the channel-induced ISI. Such measures may be used for diagnostic purposes or to adjust filter coefficients for transmitter 117 or receiver 120 to reduce the impact of channel-induced ISI on the main channel.

Transmitter 117 includes an output driver 140, synchronous storage elements 145-147, and a pair of sub-drivers 150 and 155. Storage element 145 and sub-driver 155 together form a pre-cursor filter tap, storage element 146 and driver 140 a main tap, and storage element 147 and sub-driver 150 a post-cursor filter tap.

Encoder 130 encodes auxiliary data $Data2_i$ using spread-spectrum or other techniques to reduce the impact of the apparent ISI on the main data. In one embodiment, modulator 133 multiplies the encoded auxiliary data signal $AD\alpha[-1]$ by a constant K and adds the resulting product to a filter coefficient $TX\alpha[-1]$ from a filter-coefficient generator 157. The resulting value $K*AD\alpha[-1]+TX\alpha[-1]$ is then applied to sub-driver 155. Modulator 133 thus varies the value of a filter coefficient for transmitter 117 as a function of the encoded auxiliary data.

Modulating filter coefficient $TX\alpha[-1]$ with the auxiliary data introduces small changes in continuous-time signal s(t), and consequently in signal r(t), that appear to receiver 120 as pre-cursor ISI. Auxiliary receiver 135 separates this apparent ISI from channel-induced ISI to recover auxiliary data $Data2_i$. To accomplish this recovery, auxiliary receiver 135 includes an ISI detector 170, a demodulator 172, and a decoder 175. ISI detector 170 detects cumulative ISI cISI, demodulator 172 demodulates the cumulative ISI to recover the apparent ISI signal $AD\alpha[-1]$, and decoder 175 decodes the recovered signal $AD\alpha[-1]$ to obtain auxiliary data $Data2_i$.

Auxiliary signals that minimally impact the main channel may sacrifice auxiliary-signal integrity to maximize main-channel speed performance. Encoder 130 and decoder 175 in accordance with various embodiments may thus employ noise-tolerant data encoding and decoding schemes to compensate for the poor signal quality of the auxiliary signal. In one embodiment encoder 130 and decoder 175 employ code division multiple access (CDMA) to encode and decode the auxiliary data, though other forms of data encoding might also be used. CDMA encoding and decoding techniques are well known to those of skill in the art, so a detailed discussion of CDMA is omitted for brevity. Further, adaptive equalizers often dither filter coefficients, as opposed to holding settled values stable. In such systems modulating the dither to convey auxiliary data may have little or no adverse impact on the performance of the main channel.

The embodiment of FIG. 1 is illustrative, and other embodiments will be obvious to those of skill in the art. For example, link 115 may be a wireless or optical link, and ICs 105 and 110 may be packaged together or separately. In still other embodiments ICs 105 and 110 may be instantiated, together with link 115, on a single IC device. Further, while the foregoing example assumes for simplicity that filter coefficient $TX\alpha[-1]$ is properly calibrated to zero first precursor ISI in received signal r(t), embodiments can support modulation schemes for auxiliary data $Data2_i$ that allow decoder 175 to extract auxiliary data when filter coefficient $TX\alpha[-1]$ is not so calibrated.

In an alternate embodiment an equalizing transmitter can be realized as a high-speed digital-to-analog converter (DAC) structure that can drive arbitrarily complex waveforms (to the DAC resolution). In such embodiments, filter coefficients may be applied by appropriate alteration of DAC parameters, as will be understood by those of skill in the art. With reference to the embodiment of FIG. 1, for example, transmitter 117, modulator 133, encoder 130, and generator 157, or a subset of these, could be embodied as a random-access-memory DAC (RAM-DAC) that receives $Data1_i$ and $Data2_i$ as addressing input signals. The RAM-DAC could then be populated with pre-computed values. Alternatively, one or more components of transmitter 117 could be embodied using a combination of a digital signal processor (DSP) and a DAC. In either case, continuous-time signal s(t) would exhibit the same apparent ISI as in the example of FIG. 1, and auxiliary receiver 135 could interpret the auxiliary data accordingly.

Different numbers of drivers (post-cursor and pre-cursor) may be provided in alternative embodiments, thereby allowing for transmit equalization based on values having different symbol latencies with respect to the main tap. Filter taps may also be timed to non-integer symbol latencies. The respective filter coefficients, or tap weights, of the sub-drivers can be controlled by application of transmit filter coefficients to the corresponding control inputs. Alternatively, in the case of a DAC transmit equalizer, the filter coefficients can be applied by appropriate changes to DAC parameters. Further, each of the transmit filter coefficients may be adjusted over a range of values to tailor transmitter 117 to a particular channel and noise environment. Filter-coefficient generator 157 can apply such adjustments once, e.g. at power-up, or can adapt the coefficients periodically during system operation to account for changes in the system environment that may impact performance. Methods and circuits for setting filter coefficients in accordance with some embodiments are discussed below.

The equalizing transmitter in this embodiment employs a finite-impulse-response (FIR) equalizer. Equalizers on the transmit side of a communication channel are sometimes referred to as "pre-emphasis equalizers" or "de-emphasis equalizers" because they emphasize or de-emphasize signal components prior to transmission over a channel to mitigate the signal degradation imposed by the channel. For example, with transmit equalization, typically a flattening of the total amplitude response over a frequency band of interest can be accomplished by amplifying (emphasizing) the signal frequency components most sensitive to channel loss, by attenuating (de-emphasizing) signal components that are less sensitive to channel loss, or by a combination of the two. The goal of transmit equalization is typically to reduce or minimize the effects of ISI observed at the receive side of the channel. Equalization is typically accomplished by adjusting a characteristic of a signal to mitigate the effects of ISI. In the instant case, filter-coefficient generator 157 is adjusted to reduce or eliminate the ISI effects due to the first post-cursor and first pre-cursor data values.

Figure 2:
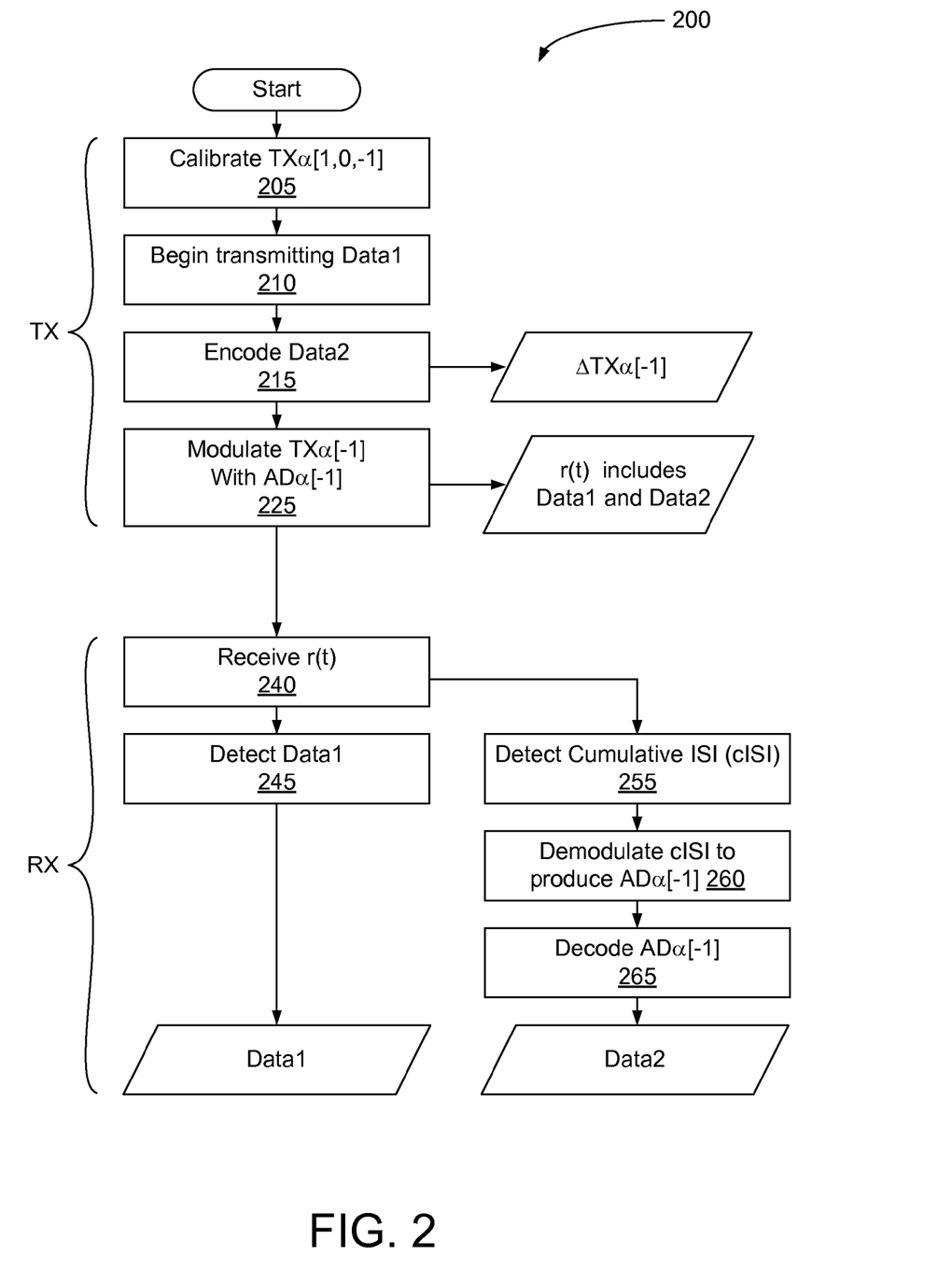
FIG. 2 depicts a flowchart 200 describing how system 100 of FIG. 1 transmits main and auxiliary data $Data1_N$ and $Data2_N$ respectively in accordance with one embodiment.

FIG. 2 depicts a flowchart 200 describing how system 100 of FIG. 1 transmits main data $Data1_i$ and auxiliary $Data2_i$ in accordance with one embodiment. First, at step 205, filter-coefficient generator 157 calibrates transmitter 117 by establishing the appropriate filter coefficients $TX\alpha[-1,0,1]$ to minimize the first pre-cursor and post-cursor ISI for the main channel. Methods for setting transmit tap values are well known, and are therefore omitted here for brevity. Next, main data $Data1_i$ is transmitted over link 115 (step 210). Then, while transmitting main data $Data1_i$, encoder 130 encodes auxiliary data $Data2_i$ (step 215) to produce encoded auxiliary data $AD\alpha[-1]$. Modulator 133 modulates filter coefficient $TX\alpha[-1]$ with the product of a scaling factor K and the encoded auxiliary data ADα[−1] (step 225) and applies the resulting modulated filter coefficient K*ADα[−1]+TXα[−1] to pre-tap sub-driver 155. As a result, continuous-time signals s(t) and r(t) will include equalized main data $Data1_i$ and, as apparent precursor ISI, auxiliary data $Data2_i$.

On the receive side, IC 110 receives the combined signal r(t) at both main receiver 120 and auxiliary receiver 135 (step 240). Main receiver 120 ignores the cumulative ISI, including the apparent precursor ISI carrying signal Data2, and recovers main data $Data1_i$ (step 245). To recover auxiliary data Data2, ISI detector 170 detects the cumulative ISI (step 255), from which demodulator 172 extracts the apparent ISI expressing encoded auxiliary data ADα[−1] (step 260). Finally, in step 265, decoder 175 decodes auxiliary data ADα[−1] to obtain data Data2.

Figure 3:
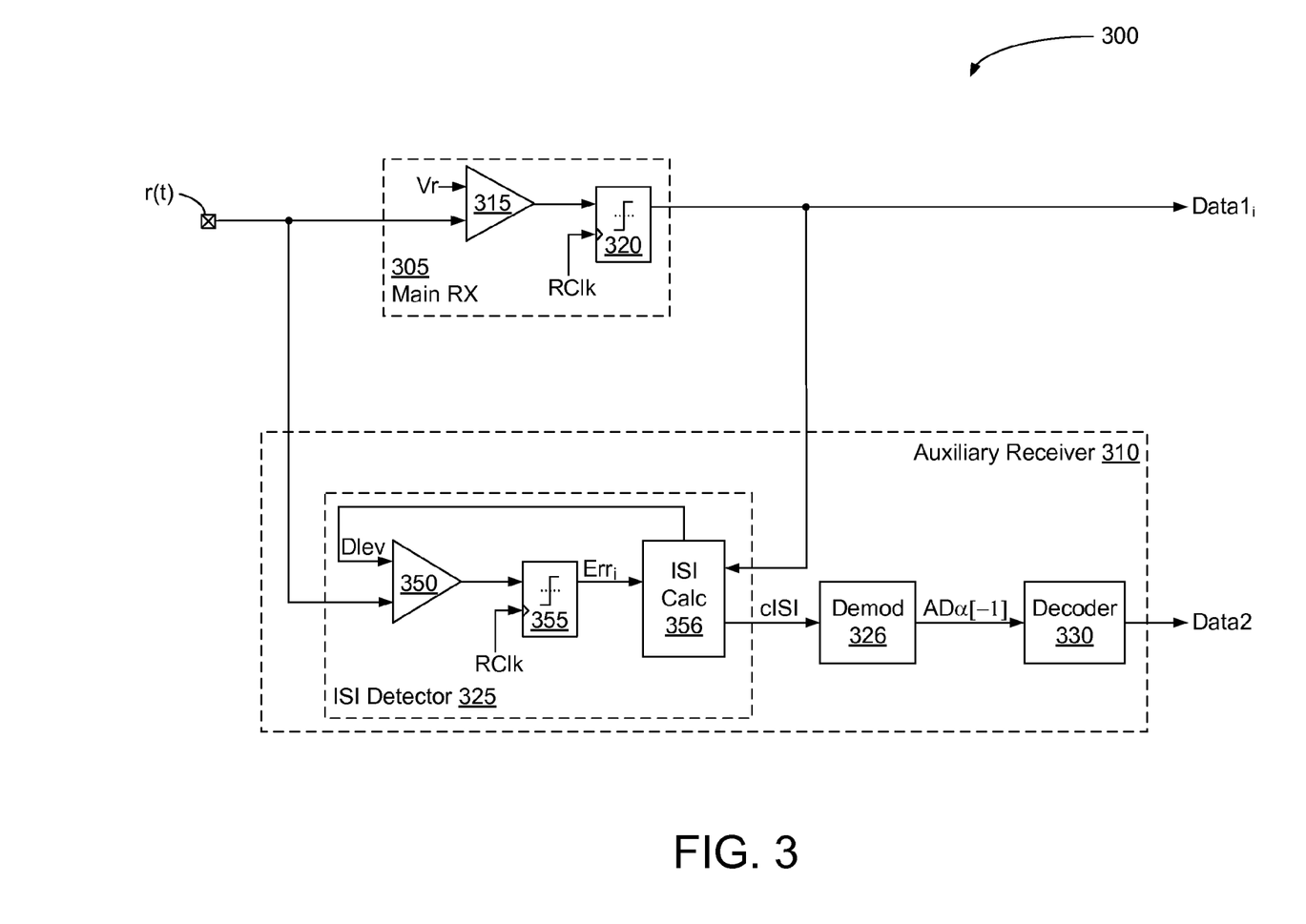
FIG. 3 depicts a multi-channel receiver 300, in accordance with one embodiment, that includes a main receiver 305 and an auxiliary receiver 310.

FIG. 3 depicts a multi-channel receiver 300, in accordance with one embodiment, that includes a main receiver 305 and an auxiliary receiver 310. Main receiver 305 includes a comparator 315 and a sampler 320 timed to a receive clock RClk. Comparator 315 compares received signal r(t) with reference voltage Vr (e.g., zero volts), outputting a signal indicative of a logic one (zero) if r(t) is greater than (less than) level Vr. Sampler 320 periodically captures the output from comparator 315 on edges of receive clock signal RClk to recover a series of data samples $Data1_i$. Data samples $Data1_i$ are conveyed to auxiliary receiver 310 and to any other circuitry (not shown) to which the received data is directed.

Auxiliary receiver 310 includes an ISI detector 325, a demodulator 326, and a decoder 330. ISI detector 325 includes a comparator 350, a sampler 355, and an ISI calculator 356. Comparator 350 compares signal r(t) with reference voltage Dlev, outputting a signal indicative of a logic one (zero) if r(t) is greater than (less than) level Dlev. Sampler 355 periodically captures the output from comparator 350 on edges of receive clock signal RClk to produce a series of error samples $Err_i$. In this embodiment, reference voltage signal Dlev represents the average voltage level representative of a logic one for incoming signal r(t).

In accordance with the depicted embodiment, ISI calculator 356 employs the data and error samples $Data1_i$ and $Err_i$ to derive data level Dlev and a measure of first pre-cursor ISI. ISI detector 325 does not distinguish between channel-induced ISI and the apparent ISI employed to convey the auxiliary data, and thus produces cumulative ISI measure cISI. Demodulator 326 separates out the auxiliary data signal ADα[−1] encoded at the transmitter to convey auxiliary data $Data2_i$, which allows decoder 330 to decode and recover auxiliary data $Data2_i$.

Though not shown, receiver 300 can include one or more equalizers to compensate for channel-induced ISI. Such equalizers might include continuous-time equalizers, decision-feedback equalizers (DFE), and partial response DFE equalizers, among others.

Figure 4A:
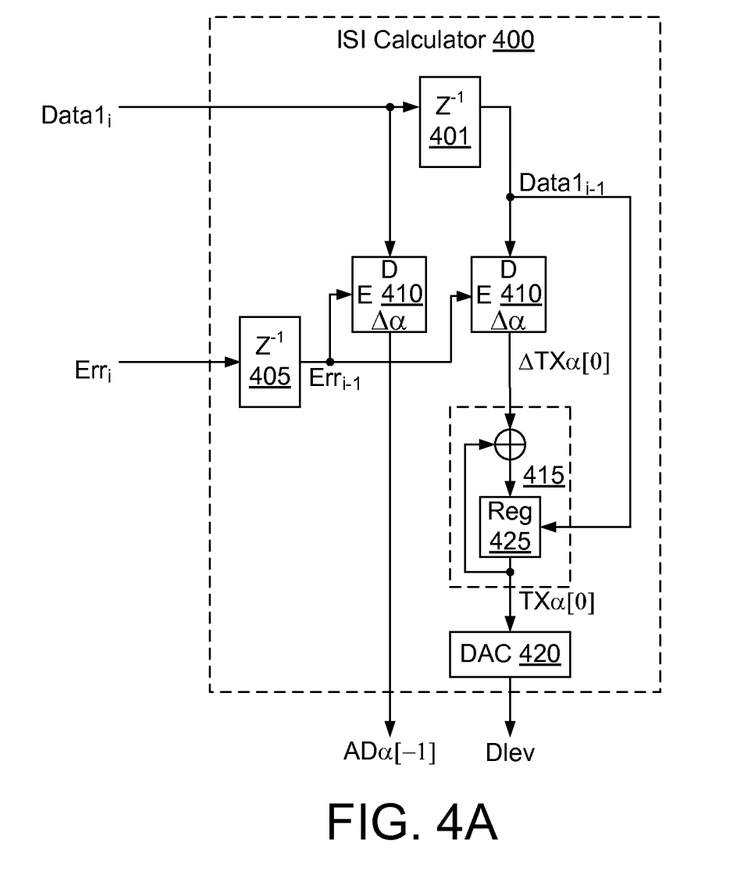
FIG. 4A depicts an ISI calculator 400 that may be used as ISI calculator 356 of FIG. 3 in accordance with one embodiment.

FIG. 4A depicts an ISI calculator 400 that may be used as ISI calculator 356 of FIG. 3 in accordance with one embodiment. ISI calculator 400 includes synchronous storage elements 401 and 405, error detectors 410, an accumulator 415, and a digital-to-analog converter (DAC) 420. Error detectors 410 detect differences between data and error samples $Data1_i$ and $Err_i$ respectively and produce corresponding offset signals ΔTXα[−1] and ΔTXα[0]. Accumulator 415 accumulates measures of offset signal ΔTXα[0] and provides a desired main filter coefficient TXα[0], which represents the average amplitude of the received data symbols. In this embodiment, a DAC 420 generates a voltage level Dlev equal to an average voltage level representative of a logic one (e.g. the upper signal level) of the received data symbols $Data1_i$ based on the main-tap filter coefficient TXα[0]. In the depicted embodiment coefficient TXα[0] is a digital value representing analog voltage level Dlev.

The error comparisons that produce error signals $Err_i$ in the embodiment of FIG. 3 are based upon the upper signal level defined by voltage Dlev and applied via comparator 350. ISI calculator 356 thus only updates the value of Dlev based upon measurements that take place when the data sample $Data1_i$ is a logic one. Storage element 405 retards each error sample by one clock cycle, so a register 425 within accumulator 415 prevents updates to the main-tap filter coefficient TXα[0], and thus to DAC 420, when the sample $Data_{i-1}$ is a logic zero. Other embodiments can include a second comparator/sampler pair to generate error samples when $Data_{i-1}$ is a logic zero, such as by comparing the incoming signal r(t) with the lower data level $Dlev_{LOW}$, where $Dlev_{LOW}$ is the average voltage level representative of a logic zero for signal r(t). Alternatively, a reference voltage to comparator 350 used in lieu of level Dlev can be varied over a number of values or ranges of values to generate error samples for various $Data_{i-1}$ values and to facilitate additional testing and error-correction methods. In those embodiments, the register 425 may apply more updates to the main-tap filter coefficient TXα[0].

Figure 4B:
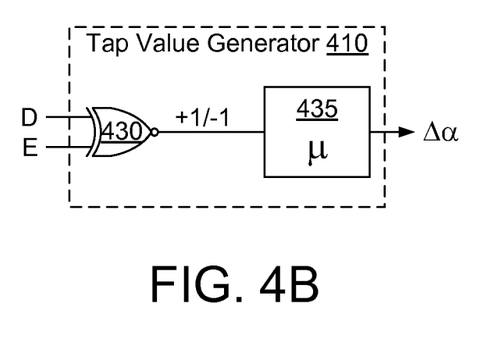
FIG. 4B details an embodiment of a tap-value generator 410 of FIG. 4A that generates a tap value using a sign-sign, least-mean-squared (SS-LMS) algorithm.

FIG. 4B details an embodiment of a tap-value generator 410 of FIG. 4A that generates an offset signal Δα using a sign-sign, least-mean-squared (SS-LMS) algorithm. Other algorithms, such as linear or gradient-descent LMS, can be used in other embodiments. Generator 410 includes an XNOR gate 430 and a multiplier 435 that multiplies the output of XNOR gate 430 by a constant μ. XNOR gate 430 compares data and error samples and presents its output to multiplier 435. The output of XNOR gate 430 represents a logic one for "true" and a logic negative one for "false." The data and error samples represent the signs of the sampled values, so XNOR gate 430 has the effect of multiplying the signs of the data and error sample and presenting the resulting product to multiplier 435. Multiplier 435 multiplies the product from XNOR gate 430 by a selected step size μ, which may be tailored for the selected filter tap.

Figure 5:
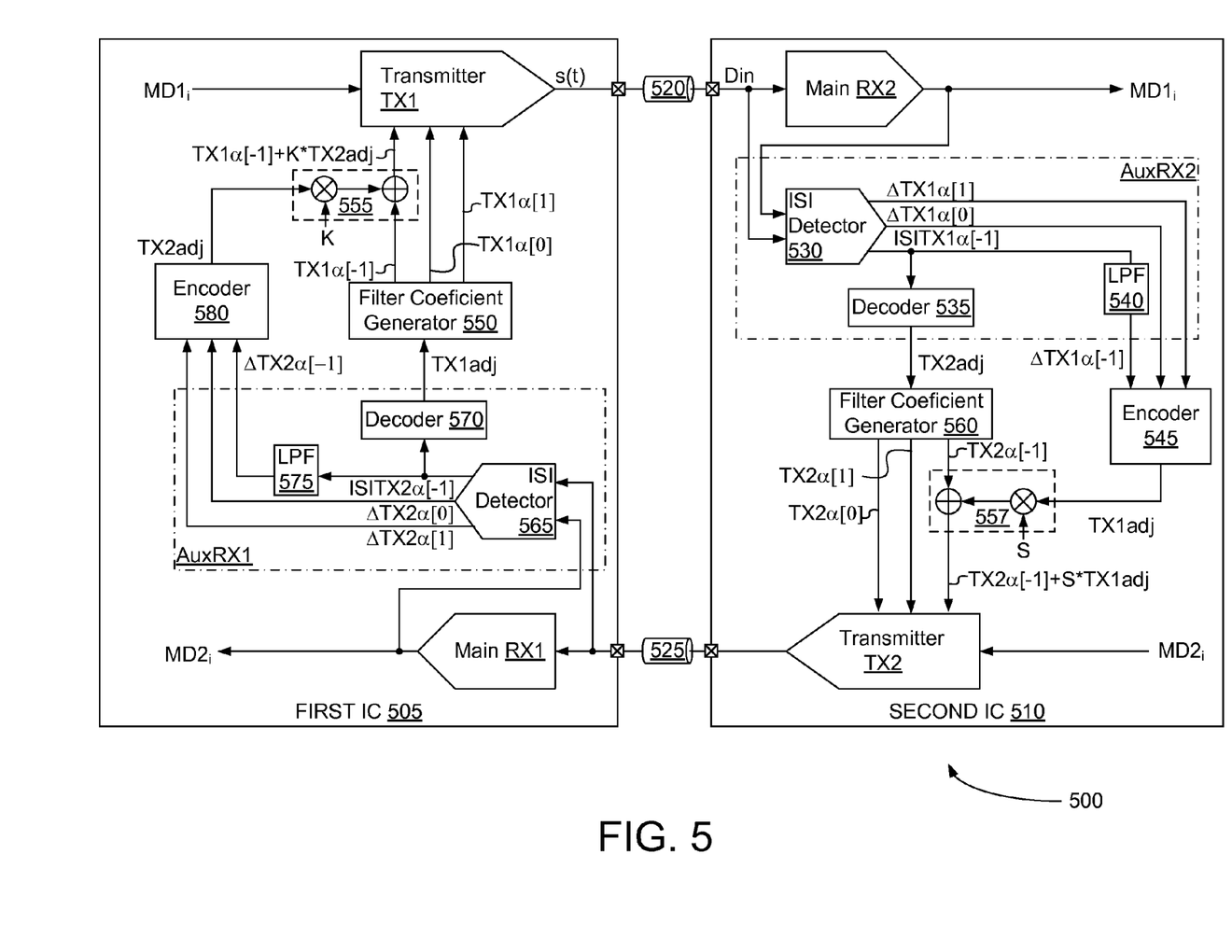
FIG. 5 depicts a communication system 500 in accordance with another embodiment.

FIG. 5 depicts a communication system 500 in accordance with another embodiment. System 500 includes two main channels. The first main channel conveys main data $MD1_i$ from an equalizing transmitter TX1 in a first IC 505 to a receiver RX2 in a second IC 510 over a link 520; the second main channel conveys main data MD2, from an equalizing transmitter TX2 on second IC 510 to a receiver RX1 on first IC 505. Links 520 and 525 are unidirectional in this example, but may be combined into one bidirectional link in other embodiments. Transmitters TX1 and TX2 each include transmit-equalization circuitry to account for channel-dependent attenuation, and thus facilitate higher signal rates. Filter coefficients for the equalization circuitry are provided for transmitters TX1 and TX2 by respective filter-coefficient generators 550 and 560.

IC 510 includes an auxiliary receiver AuxRX2 and an encoder 545. Auxiliary receiver AuxRX2 includes an ISI detector 530 to measure characteristics of incoming main-data signal MD1 on link 520, and to provide feedback signals ΔTX1α[1,0,−1] for transmitter TX1 on IC 505. Encoder 545 encodes feedback signals ΔTX1α[1,0,−1] and conveys the resulting encoded adjustment signal TX1adj to IC 505 using an auxiliary data channel of the type detailed above in connection with FIGS. 1-3. IC 505 includes an auxiliary receiver AuxRX1 and an encoder 580 that may function in the same manner as auxiliary receiver AuxRX2 and encoder 545 to provide feedback signals ΔTX2α[1,0,−1] and an encoded adjustment signal TX2adj for transmitter TX2.

For transmission from left to right, transmitter TX1 transmits first data $MD1_i$ as a continuous-time signal s(t) equalized using filter coefficients TX1α[1:−1], and transmits second data TX2adj using a modulator 555 to combine signal TX2adj with filter coefficient TX1α[−1]. In this example, modulator 555 multiplies second data TX2adj by a constant K and adds the resulting product to filter coefficient TX1α[−1]. Modulating the filter coefficient input associated with filter coefficient TX1α[−1] encodes the second data as apparent ISI on transmitted signal s(t) and corresponding received signal r(t). ISI detector 530 in auxiliary receiver AuxRX2 extracts three ISI measures from incoming signal Din. The first two, ΔTX1α[1] and ΔTX1α[0], are offset signals for the respective first post-cursor tap and the main tap for transmitter TX1; the third, ISITX1α[−1], is an offset signal that combines of the channel-induced ISI associated with the first pre-cursor tap of transmitter TX1 and the apparent ISI used to convey the auxiliary adjustment signal TX2adj. A decoder 535 demodulates and decodes adjustment signal TX2adj from signal ISITX1α[−1], while a low-pass filter 540 rejects the encoded adjustment signal TX2adj to leave an error measurement ΔTX1α[−1] for the first pre-cursor tap of transmitter TX1. Filter-coefficient generator 560 adjusts filter coefficients TX2α[1,0,−1] as directed by adjustment signal TX2adj. Encoder 545 encodes the three error measurements ΔTX1α[1,0,−1] to create adjustment signal TX1adj as corrective feedback for transmitter TX1.

Communicating in the reverse direction, transmitter TX2 transmits second data $MD2_i$ and adjustment signal TX1adj using a modulator 557 to combine signal TX1adj with filter coefficient TX2α[−1]. In this example, modulator 557 multiplies second data TX2adj by a constant S and adds the resulting product to filter coefficient TX2 α[−1]. ISI detector 565 in auxiliary receiver AuxRX1 extracts three ISI measures from the incoming signal. The first two, ΔTX2α[1] and ΔTX2α[0], are offset signals for the respective first post-cursor tap and the main tap for transmitter TX2; the third, ISITX2α[−1], is an offset signal that combines of the channel-induced ISI associated with the first pre-cursor tap of transmitter TX2 and the apparent ISI induced in signal r(t) when auxiliary adjustment signal TX1adj is added to the first pre-cursor filter coefficient of transmitter TX2. A decoder 570 demodulates and decodes adjustment signal TX1adj from ISI signal ISITX2α[−1], while a low-pass filter 575 rejects the encoded adjustment signal TX1adj to leave an ISI measurement ΔTX2α[−1] for the first pre-cursor tap of transmitter TX1. Filter-coefficient generator 550 adjusts filter coefficients TX1α[1,0,−1] as directed by adjustment signal TX1adj. Encoder 580 encodes the three ISI measurements ΔTX2α[1,0,−1] to update the values of adjustment signal TX2adj as needed. Each of ICs 505 and 510 thus provides feedback for calibrating the transmitter of the other.

Figure 6A:
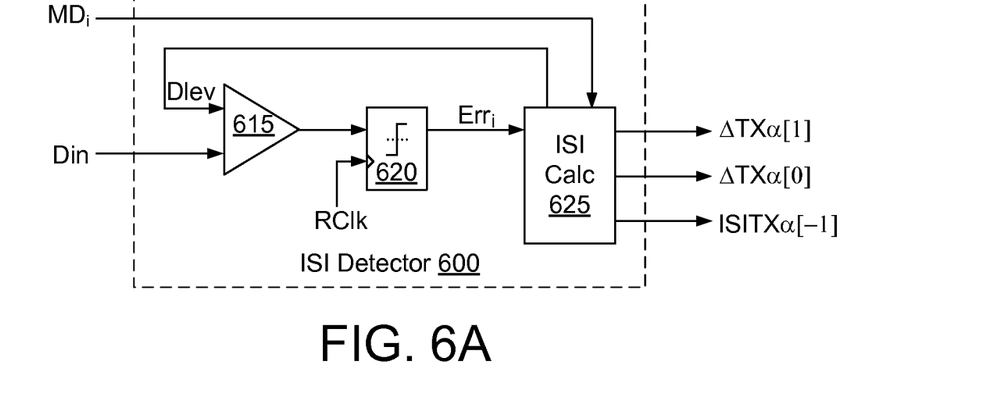
FIG. 6A depicts an ISI detector 600 that may be used for ISI detectors 530 and 565 of FIG. 5.

FIG. 6A depicts an ISI detector 600 that may be used for ISI detectors 530 and 565 of FIG. 5. ISI detector 600 includes a comparator 615, a sampler 620, and an ISI calculator 625. Comparator 615 compares input signal Din with a reference voltage Dlev, outputting a signal indicative of a logic one (zero) if Din is greater than (less than) level Dlev. Sampler 620 periodically captures the output from comparator 615 on edges of receive clock signal RClk to produce a series of error samples $Err_i$. Voltage Dlev represents the average voltage level representative of a logic one for incoming signal Din.

ISI calculator 625 employs the data and error samples to extract three ISI measures from incoming signal Din. Signal ΔTXα[1] represents errors associated with first post-cursor ISI; signal ΔTXα[0] represents errors associated with the main cursor; and signal ISITXα[−1] represents channel-induced first precursor ISI combined with apparent first precursor ISI encoded with an auxiliary signal (e.g., TX1adj or TX2adj). The auxiliary signal can be used to adjust transmit or receive equalizers, or may be used for some other purpose. Moreover, the auxiliary signal can be conveyed in combination with other filter coefficients.

Figure 6B:
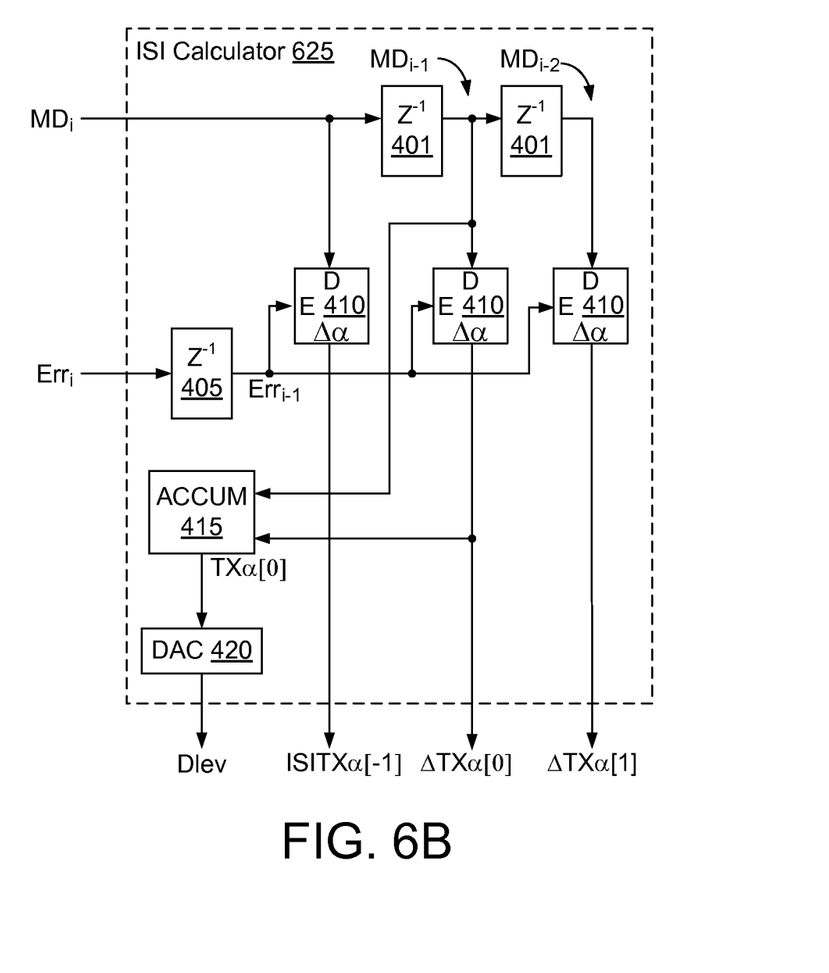
FIG. 6B depicts an embodiment of ISI calculator 625.

FIG. 6B depicts an embodiment of ISI calculator 625, which uses a number of elements in common with ISI calculator 400 of FIG. 4A. An additional storage element 401 and tap-value generator 410 have been added to provide a measure for an additional coefficient-adjustment signal ΔTXα[1].

Figure 7:
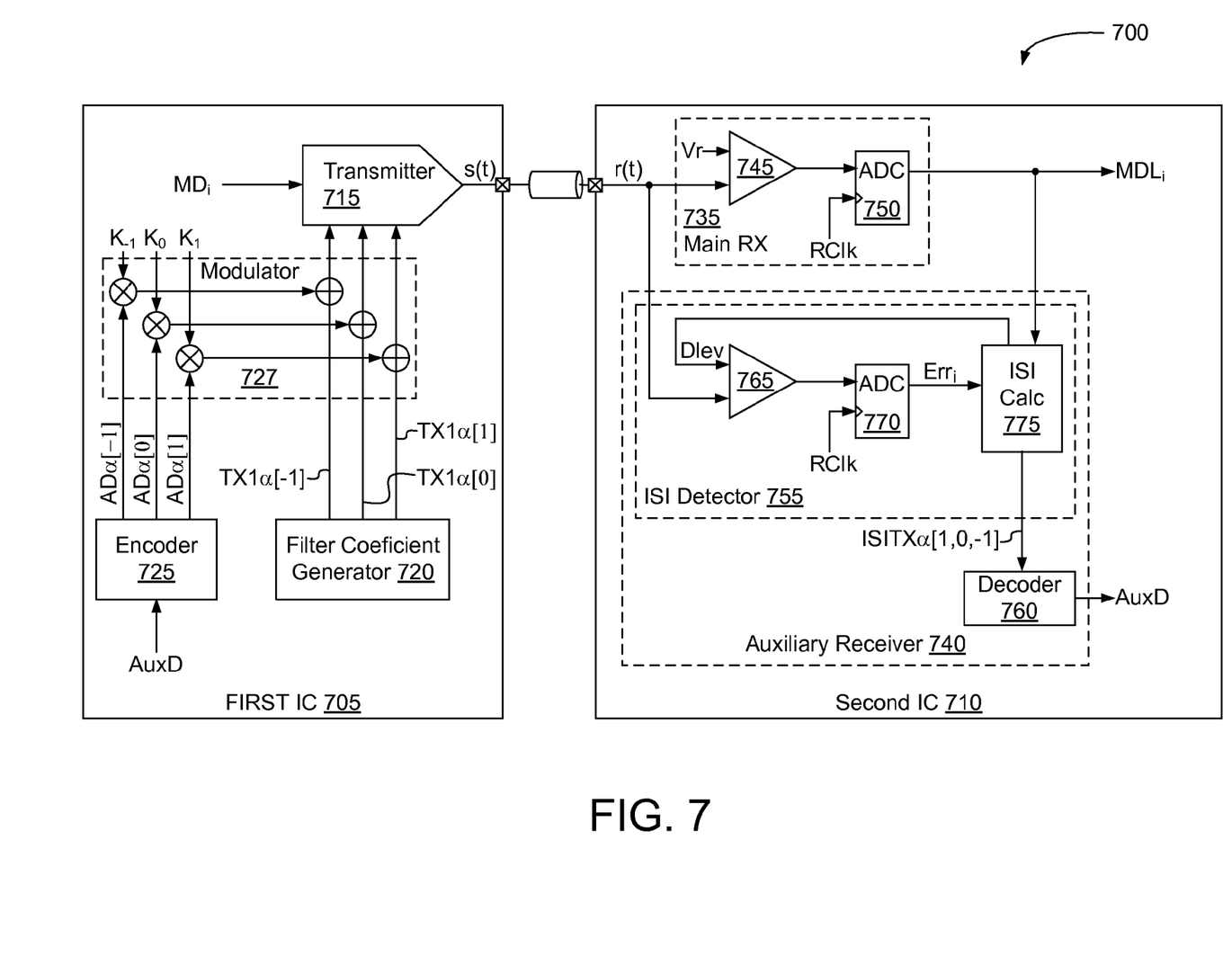
FIG. 7 depicts a system 700 in accordance with an embodiment in which a single communication lane between first and second ICs 705 and 710 supports multiple auxiliary channels.

FIG. 7 depicts a system 700 in accordance with an embodiment in which a single communication lane between first and second ICs 705 and 710 supports multiple auxiliary channels. IC 705 includes a transmitter 715, a filter-coefficient generator 720, an encoder 725, and a modulator 727. All of these elements may work substantially as described above for similarly named components in other embodiments to support multiple auxiliary communication channels.

Encoder 725 encodes auxiliary data AuxD to produce three respective encoded auxiliary signals ADα[1,0,−1]. Modulator 727 multiplies each of the encoded auxiliary signals by a respective scaling factor ($K_1$, $K_0$, $K_{-1}$). The resulting products are added to respective filter coefficients TX1α[1:−1]. The resulting modulated filter coefficients, or "tap weights," are then applied to respective filter taps of transmitter 715.

Second IC 710 includes a main receiver 735 and an auxiliary receiver 740. Main receiver 735 includes a differential amplifier 745 and an analog-to-digital converter (ADC) 750. Amplifier 745 compares signal r(t) with reference voltage Vr to produce an output signal having a voltage level proportional to the difference between the two. ADC 750 periodically converts the output voltage from amplifier 745 into a digital value $MDL_i$ representative of the level. A differential amplifier 765 and ADC 770 in ISI detector 755 similarly derive digital error sample levels $Err_i$ by comparing signal r(t) with a data-level signal Dlev. An ISI calculator 775 calculates error signals ISITXα[1,0,−1] from the error and data samples using a least mean squared (LMS) algorithm.

In prior examples the ISI calculators received the signs of the data and error samples as input. In this embodiment ISI calculator 775 receives digital values $MDL_i$ and $Err_i$ representative of the amplitudes of the data and error signals. The additional information produced by ADCs 750 and 770 allows ISI calculator 775 to an LMS algorithm that separately calculates error contributions for different taps. A decoder 760 demodulates and decodes auxiliary signals AuxD from the output signals from ISI detector 755.

The use of an LMS algorithm that receives measures of signal amplitude in lieu of sign values supports additional auxiliary channels and obviates the need for a calibration step like step 205 of FIG. 2. The sign-sign LMS algorithm may be preferred, however, due to its relative simplicity. LMS algorithms are commonly used in adaptive filters to calculate filter coefficients, so a detailed discussion of ISI calculator 775 is omitted for brevity.

Channel-induced ISI is pattern and channel dependent. The filter coefficients used to compensate for channel-induced ISI are therefore derived by measuring the impact of ISI on received data patterns for the main channel. Some embodiments therefore support a return channel to convey ISI measurements to the transmitting side of a communications system. In contrast, apparent ISI expressing encoded auxiliary data is derived from transmitted auxiliary data that is logically independent of the data transmitted or received via the main channel. Apparent ISI thus supports one or more auxiliary channels that convey data in the same direction as the main channel.

In the foregoing description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. Finally, embodiments of the invention may be adapted for use with multi-pulse-amplitude-encoded (multi-PAM) signals.

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable medium. Those of skill in the art of integrated circuit fabrication can use such encoded data to fabricate integrated circuits comprising one or more of the circuits described herein.

While the present invention has been described in connection with specific embodiments, variations of these embodiments will be obvious to those of ordinary skill in the art. For example, communication systems in accordance with other embodiments need not transmit main data; instead, the transmitter might convey e.g. random or spectrally conditioned data to guide the equalizer tap detection and clock recovery. And, similar to the case with discrete multi-tone, the bit rates and other characteristics of each sub-channel may be optimized to achieve the highest overall link performance. Systems that do transmit main data may also support random or spectrally conditioned data to support auxiliary-data transmission when no main data is in transit. Additionally, embodiments may be used in multiple-input multiple-output (MIMO) systems, in which filter coefficients may be selected to equalize interchannel interference (ICI) in addition to ISI. Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. Section 112.

What is claimed is:

1. A system comprising:
    a first data input node to receive first data;
    a second data input node to receive second data;
    an equalizing transmitter including:
        a transmitter input node coupled to the first data input node to receive the first data;
        a transmitter data output node to transmit the first data; and
        a filter-coefficient input node to receive a filter-coefficient input signal;
    a modulator coupled between the second data input node and the filter-coefficient input node to modulate the filter-coefficient input signal with the second data to induce apparent inter-symbol interference in the transmitted first data; and
    a receiver coupled to the transmitter data output node to receive the first data and demodulate the apparent inter-symbol interference to recover the second data.

2. The system of claim 1, further comprising a filter-coefficient generator coupled to the filter-coefficient input node.

3. The system of claim 2, further comprising an encoder coupled to the modulator to encode the second data.

4. The system of claim 1, wherein the transmitted first and second data exhibit channel-induced intersymbol interference (ISI) at the receiver, and wherein the equalizing transmitter applies a filter coefficient signal to the filter-coefficient input node to compensate for the channel-induced ISI.

5. The system of claim 4, wherein the modulator modulates the filter coefficient signal with the second data to obtain the modulated second data.

6. The system of claim 1, wherein the receiver comprises:
    a receiver input node to receive the first data and the modulated second data;
    a main receiver to recover the first data;
    an ISI detector coupled to the receiver input node; and
    a demodulator coupled to the ISI detector, the demodulator to recover the modulated second data.

7. The system of claim 6, wherein the ISI detector provides a measure of cumulative intersymbol interference (ISI) on an ISI-detector output node, and wherein the cumulative ISI includes channel-induced ISI and apparent ISI induced by the modulated second data.

8. The system of claim 7, wherein the modulated second data is encoded data, the receiver further comprising a decoder coupled to the demodulator to decode the encoded data.

9. The system of claim 1, further comprising a third transmitter data input node to receive third data, wherein the equalizing transmitter further includes a second filter tap having a second filter-coefficient input node to receive the third data.

10. The system of claim 9, wherein the modulator modulates the third data and the transmitter transmits the modulated third data with the first data and the modulated second data.

11. The system of claim 10, wherein the receiver comprises:
    a receiver input node to receive the first data and the modulated second and third data;
    a main receiver coupled to the receiver input node to recover the first data; and
    an auxiliary receiver coupled to the receiver input node, the auxiliary receiver including an ISI detector to detect the modulated second and third data.

12. The system of claim 11, further comprising a modulator coupled to the ISI detector to demodulate the second and third data.

13. A method comprising: receiving a combined signal, the combined signal including first main data and auxiliary data; recovering the first main data from the combined signal; detecting first intersymbol interference of the combined signal, the first intersymbol interference including the auxiliary data; demodulating the first intersymbol interference to recover the auxiliary data; generating a filter coefficient; modulating the filter coefficient using the auxiliary data; equalizing second main data, using the modulated filter coefficient, to provide equalized second main data, wherein modulating the filter coefficient using the auxiliary data induces apparent intersymbol interference in the equalized second main data; and transmitting the equalized second main data with the apparent intersymbol interference.

14. The method of claim 13, wherein the auxiliary data is encoded data, the method further comprising decoding the auxiliary data.

15. The method of claim 13, wherein the intersymbol interferences includes apparent ISI and channel-induced ISI.

16. A multi-channel communication system comprising: a first data input node to receive first data; a second data input node to receive second data; a filter-coefficient input node to receive a filter-coefficient input signal; a data output node to transmit the first data as an equalized signal; a modulator coupled between the second data input node and the filter-coefficient input node to modulate the filter-coefficient input signal with the second data to induce apparent intersymbol interference in the transmitted first data; and means for detecting the apparent intersymbol interference from the equalized signal.

17. The system of claim 16, further comprising means for encoding the second data before modulating the filter-coefficient input signal.

18. The system of claim 16, further comprising means for demodulating the apparent intersymbol interference to recover the modulated second data.

19. A non-transitory computer-readable medium having stored thereon a data structure defining a transmitter adapted to transmit first and second signals expressed as sequences of symbols, the data structure comprising:

first data representing first and second input nodes to receive the first and second signals;

second data representing an output node to transmit the first signal;

third data representing a filter tap with a filter-coefficient input node to receive a filter-coefficient input signal; and fourth data representing a modulator coupled between the second input node and the filter-coefficient input node to modulate the filter-coefficient input signal with the second signal to induce apparent inter-symbol interference in the first signal.

20. An integrated circuit comprising: a first transmitter data input node to receive first data; a second transmitter data input node to receive second data; a transmitter data output node to transmit the first data; a filter-coefficient input node to receive a filter-coefficient signal; and a modulator coupled between the second transmitter data input node and the filter-coefficient input node to modulate the filter-coefficient signal with the second data to induce apparent intersymbol interference in the transmitted first data.

21. The integrated circuit of claim 20, further comprising a filter-coefficient generator coupled to the modulator.

22. The integrated circuit of claim 20, wherein the transmitter transmits the first data as an equalized signal and induces apparent intersymbol interference onto the equalized signal responsive to the modulated filter-coefficient signal.

23. A receiver comprising: a receiver input node to receive a combined signal, the combined signal conveying first data and exhibiting cumulative intersymbol interference (ISI), the cumulative ISI including channel-induced ISI and apparent ISI; a main receiver to recover the first data; an ISI detector coupled to the receiver input node to detect the cumulative ISI; a demodulator coupled to an output of the ISI detector to demodulate the apparent ISI to recover second data from the cumulative ISI; a transmitter to transmit a second combined signal; and a modulator coupled between the demodulator and the transmitter, the modulator to modulate the combined signal with the second data to induce second apparent intersymbol interference in the second combined signal.

24. The receiver of claim 23, wherein the cumulative ISI includes channel-induced ISI and apparent ISI, wherein apparent ISI comprises the second data.

25. The receiver of claim 24, further comprising a decoder coupled to an output of the demodulator to decode the second data.

26. The receiver of claim 24, wherein the apparent ISI is apparent pre-cursor ISI.

* * * * *